US 6,669,912 B1

(12) United States Patent   (10) Patent No.: US 6,669,912 B1
Udell                        (45) Date of Patent: Dec. 30, 2003

(54) FLEXIBLE COMBINED VIBRATION DECOUPLING EXHAUST CONNECTOR AND PRELIMINARY CATALYTIC CONVERTER CONSTRUCTION

(75) Inventor: Randal R. Udell, Lemont, IL (US)

(73) Assignee: Senior Investments AG, Schaffhausen (CH)

(*) Notice: Subject to any disclaimer, the term of this patent is extended or adjusted under 35 U.S.C. 154(b) by 0 days.

(21) Appl. No.: 09/503,883

(22) Filed: Feb. 15, 2000

(51) Int. Cl.⁷ .................. F01N 3/28; B01D 53/94; F16L 27/11; F16L 51/02

(52) U.S. Cl. .................. 422/179; 422/177; 422/180; 285/49; 285/226

(58) Field of Search .................. 422/168–183; 60/299, 300; 285/49, 226, 227

(56) References Cited

U.S. PATENT DOCUMENTS

| 3,645,092 A | 2/1972 | Tatsutomi et al. |
| 3,845,621 A | 11/1974 | Goto et al. |
| 3,864,909 A | 2/1975 | Kern |
| 3,891,396 A | 6/1975 | Musall et al. |
| 3,902,853 A | 9/1975 | Marsee et al. |
| 3,948,611 A | 4/1976 | Stawsky |
| 3,966,419 A | 6/1976 | Bloomfield |
| 3,982,396 A | 9/1976 | Suzuki |
| 3,990,856 A | 11/1976 | Suzuki |
| 4,078,381 A | 3/1978 | Kumai |
| 4,083,182 A | 4/1978 | Ikeya |
| 4,143,513 A | 3/1979 | Konishi et al. |
| 4,161,509 A | 7/1979 | Nowak |
| 4,186,172 A | 1/1980 | Scholz |
| 4,188,783 A | 2/1980 | Sayo et al. |
| 4,235,846 A | 11/1980 | Abthoff et al. |
| 4,248,833 A | 2/1981 | Aoyama |
| 4,250,146 A | 2/1981 | Bailey |
| 4,353,872 A | 10/1982 | Midorikawa |
| 4,353,873 A | 10/1982 | Noritake et al. |
| 4,420,933 A | 12/1983 | Kajitani et al. |
| 4,444,721 A | 4/1984 | Ohkata |
| 4,444,725 A | 4/1984 | Feaster |
| 4,448,754 A | 5/1984 | Isogai et al. |
| 4,457,141 A | 7/1984 | Yoshioka |
| 4,511,536 A | 4/1985 | Shimozi et al. |
| 4,559,776 A | 12/1985 | Arai et al. |
| 4,748,807 A | 6/1988 | Vladimir |
| 4,782,661 A | 11/1988 | Motley et al. |
| 4,795,616 A | 1/1989 | Mondt et al. |
| 5,094,073 A | 3/1992 | Wörner |
| 5,104,627 A | 4/1992 | Usui et al. |
| 5,145,215 A * | 9/1992 | Udell .................. 285/49 |
| 5,167,430 A | 12/1992 | Bainbridge |
| 5,173,267 A | 12/1992 | Maus et al. |
| 5,190,732 A | 3/1993 | Maus et al. |
| 5,248,859 A | 9/1993 | Boria |
| 5,272,875 A | 12/1993 | Kaji |
| 5,293,743 A | 3/1994 | Usleman et al. |
| 5,410,877 A | 5/1995 | Shimada et al. |

(List continued on next page.)

FOREIGN PATENT DOCUMENTS

| DE | 3518756 | 11/1986 |
| DE | 286 645 | 1/1991 |
| GB | 2 265 843 | 10/1993 |
| JP | 51149220 | 11/1976 |
| JP | 51053360 | 2/1977 |
| JP | 57114478 | 7/1982 |
| WO | WO 87/05357 | 11/1987 |

*Primary Examiner*—Hien Tran (57) ABSTRACT

A flexible catalytic converter apparatus for use in internal combustion engine powered vehicle exhaust systems. The flexible catalytic converter apparatus includes a vibration decoupling exhaust connector and a catalytic converter insert disposed within, one of the components of the vibration decoupling exhaust connector.

13 Claims, 9 Drawing Sheets

U.S. PATENT DOCUMENTS

| | | |
|---|---|---|
| 5,488,826 A | 2/1996 | Paas |
| 5,656,245 A | 8/1997 | Fujisawa et al. |
| 5,674,461 A | 10/1997 | Kato et al. |
| 5,726,119 A | 3/1998 | Sera et al. |
| 5,730,946 A | 3/1998 | Linnarsson |
| 5,736,690 A | 4/1998 | Karlsson |
| 5,758,497 A | 6/1998 | Frederiksen et al. |
| 5,775,100 A | 7/1998 | Sloss et al. |
| 5,782,089 A | 7/1998 | Machida et al. |
| 5,881,553 A | 3/1999 | Steenackers et al. |

* cited by examiner

FLEXIBLE COMBINED VIBRATION
DECOUPLING EXHAUST CONNECTOR AND
PRELIMINARY CATALYTIC CONVERTER
CONSTRUCTION

BACKGROUND OF THE INVENTION

1. Field of the Invention

The present invention relates to connectors for joining the ends of successive lengths of pipe or conduit and/or the connecting of pipe or conduit to a bracket, flange, housing or other mounting surface wherein the connection will be exposed to axial, transverse and bending vibrations. In particular, the present invention relates to connectors for joining a pipe from an exhaust manifold in an exhaust system to a downstream exhaust pipe. The present invention also relates to pipe constructions which incorporate catalytic converter devices.

2. The Prior Art

It is known that in vehicle exhaust systems, the motor produces a significant amount of vibration in the exhaust pipes. Operation of the motor at continuous speeds for prolonged periods of time can, especially, produce what are known as harmonic vibrations which can cause significant deflections in extended lengths of exhaust pipe. Repeated deflections of the exhaust will, in turn, cause the pipe to weaken with time and, ultimately, possibly fail. Further, such harmonic vibrations may also be transmitted through the exhaust pipes to the mountings of the pipes, promoting the loosening of the mountings, which can result in the sudden displacement of one or more components of the exhaust system, with the potential for both personal injury and equipment damage.

In addition, the transmission of vibrations through the mountings of the pipes can produce additional noise transmissions to the interior of the vehicle.

In addition to the vibrations created by the motor of the vehicle, an exhaust system is also subjected to various tension, compression and bending forces which also arise during the operation of the vehicle. While individual exhaust system components might be made stronger and more massive to resist failure by fatigue, such constructions would be undesirable due to weight considerations. Further, by making individual elements stiffer, the vibrations are merely transmitted to the exhaust system mountings or other components, not reduced or eliminated. Accordingly, it is desirable to isolate the exhaust system, or at least components of the system, from such vibrations and forces.

One example of a prior art vibration decoupling connector is found in U.S. Pat. No. 5,145,215 to Udell. The Udell '215 patent discloses a flexible vibration decoupling connector for connecting two pipe ends, wherein one pipe end insertably receives and overlaps another pipe end. A vibration absorbing damping member, typically in the form of a metal mesh member, is radially interposed between overlapping type ends. The entire connection is surrounded by an elongated bellows structure, which is sealing affixed at its ends to the respective overlapping pipes. This flexible vibration decoupling connector is thus capable of providing a fluid tight connection between two pipe ends which are decoupled with respect to the transmission of vibrations from one pipe to the other. The flexible vibration decoupling connector of the Udell '215 patent is further capable of accommodating substantial axial relative movement between the pipe ends, as well as some relative pivoting movement of one pipe to another.

Catalytic converters have been for many years placed into the exhaust gas path of internal combustion engine driven vehicles for the purposes of reducing the harmful emissions from these vehicles. Since such catalytic converters have been in use, it has become known that for proper operation of the catalytic converters they need to operate at a relatively high temperature and it has become desirable to configure the exhaust systems of such vehicles so that the catalytic converters will be brought up to operating temperature as quickly as possible. One method for doing this is to provide an insulated (e.g., double-walled) exhaust pipe, from the outlet of the exhaust manifold, to the inlet of the converter.

In order to respond to anticipated ever increasingly stringent emissions requirements being imposed upon auto manufacturers, multi-part catalytic converter systems are being contemplated, in which one or more preliminary converter may installed far upstream in the exhaust system, perhaps even immediately downstream of the exhaust manifold, to obtain maximum advantage of the highest temperature exhaust gases, for optimal functioning of the catalytic materials in the converter. Such preliminary converters must be relatively small in size, due to the space limitations of the engine compartments of most internal combustion engine-powered vehicles. The provision of the preliminary converter is desired to permit the remaining exhaust system design configurations to be largely unchanged, so that the conventional larger converters which are presently in use, for example, typically under the floor plan under the passenger compartment of most passenger cars, need not be reconfigured, while still obtaining enhanced emissions control performance.

The placement of a preliminary converter in the exhaust system of a vehicle is problematic, however, in that the space typically would be otherwise occupied by a flexible connector that joins the exhaust pipe immediately exiting the exhaust manifold with the downstream exhaust system components typically positioned underneath the vehicle. Omission of such exhaust system vibration decouplers is not a viable alternative, for the reasons discussed at length hereinabove.

Accordingly, it is desirable to provide a flexible connector construction which permits the placement of a preliminary catalytic converter in the exhaust flow of an internal combustion engine exhaust system far upstream of the conventionally located and configured catalytic converter.

Such desirable features of the present invention will become apparent in view of the present specification, claims, and drawings.

SUMMARY OF THE INVENTION

A flexible catalytic converter apparatus, for an exhaust system of an internal combustion engine, comprising a vibration decoupling flexible connector for connecting upstream and downstream components in an exhaust system. The vibration decoupling flexible connector includes an upstream liner tube and a downstream liner tube, in which portions of the liner tubes overlap axially, a vibration damping member operably disposed between the upstream and downstream liner tubes, and a flexible sealing member sealingly connecting the upstream and downstream liner tubes, to preclude escape of exhaust gases, passing through the vibration decoupling flexible connector, to ambient atmosphere. The flexible catalytic converter also includes a catalytic converter insert, operably disposed within at least the downstream liner tube, so that, upon installation of the flexible catalytic converter apparatus into an exhaust system for an internal combustion engine, exhaust gases passing through the vibration decoupling flexible connector are constrained to pass through the catalytic converter insert, for at least partial catalytic conversion of predetermined undesirable components of the exhaust gases.

According to a preferred embodiment of the invention, the vibration damping member is an annular member.

The flexible catalytic converter may further comprise a mounting flange sealingly connected, at least indirectly, to an upstream one of the liner tubes, for mechanically and sealingly connecting the vibration decoupling flexible connector to an upstream component of an exhaust system.

Preferably, the vibration damping member is disposed between the overlapping portions of the upstream and downstream liner tubes.

Preferably, the upstream and downstream liner tubes comprise a first liner tube having a first diameter and a radially inwardly extending flange emanating from a first end thereof; and a second liner tube having a second diameter less than the first diameter, and a radially outwardly extending flange emanating from a first end thereof. Preferably, the first end of the first liner tube axially overlaps the first end of the second liner tube, so that the first end of the first liner tube, the radially inwardly extending flange, the first end of the second liner tube and the radially outwardly extending flange define a substantially enclosed annular region between the overlapping portions of the liner tubes. The first liner tube may be the upstream liner tube. Alternatively, the second liner tube may be the upstream liner tube.

The vibration damping member may be disposed within the substantially enclosed annular region. The vibration damping member may be fabricated from at least one of the following: compressed metal mesh, ceramic wool.

The flexible sealing member is preferably a longitudinally extending bellows, having at least one circumferential, radially extending corrugation.

Preferably, the catalytic converter insert comprises a substantially cylindrical body, having a plurality of passages extending therethrough, the surfaces of which have catalytic material disposed thereon, whereupon passage of exhaust gases therethrough, the exhaust gases contact the catalytic material and become chemically altered.

The catalytic converter insert is preferably positioned within the downstream liner tube, so as to be substantially mechanically decoupled from vibrations emanating from an upstream exhaust system component, when the flexible catalytic converter apparatus is attached to upstream and downstream exhaust system components.

The upstream liner tube may be substantially shorter in length than the downstream liner tube, so that upon installation of the flexible converter apparatus into an exhaust system, positioning of the catalytic converter insert in maximized proximity to the exhaust manifold of the internal combustion engine is facilitated.

DETAILED DESCRIPTION OF THE DRAWINGS

While this invention is susceptible of embodiment in many different forms, there is shown in the drawings and will be described in detail, a specific embodiment, with the understanding that the present disclosure is to be considered as an exemplification of the principles of the invention and is not intended to limit the invention to the embodiment illustrated.

Figure 1:
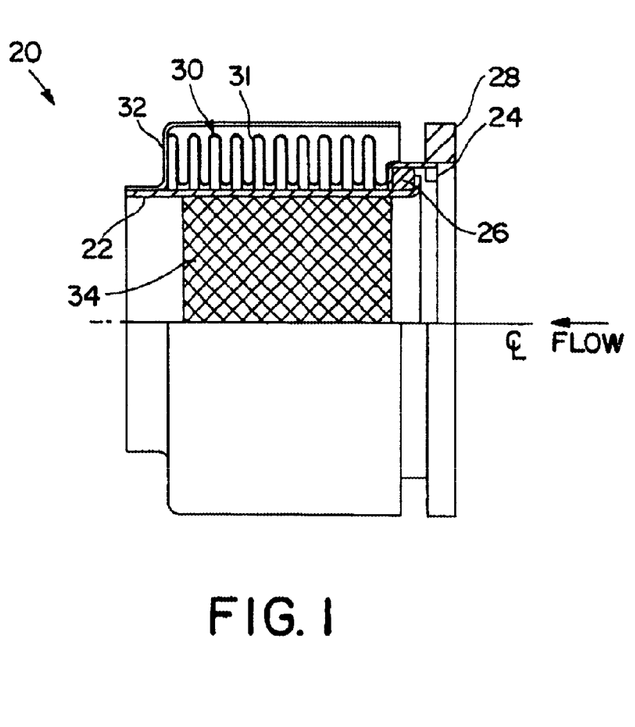
FIG. 1 is a side elevation, partially in section, of the combined flexible connector/catalytic converter apparatus of the present invention.
Figure 2:
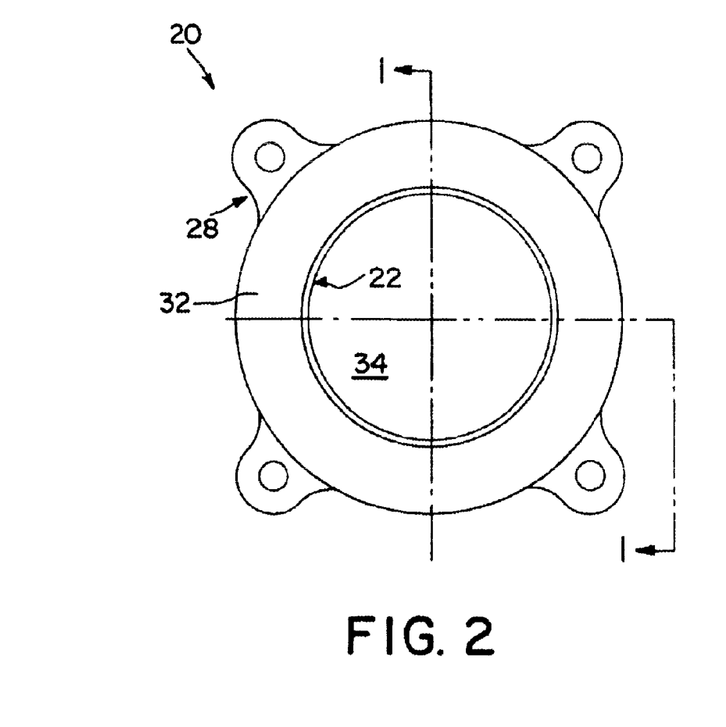
FIG. 2 is an end elevation thereof.
Figure 3:
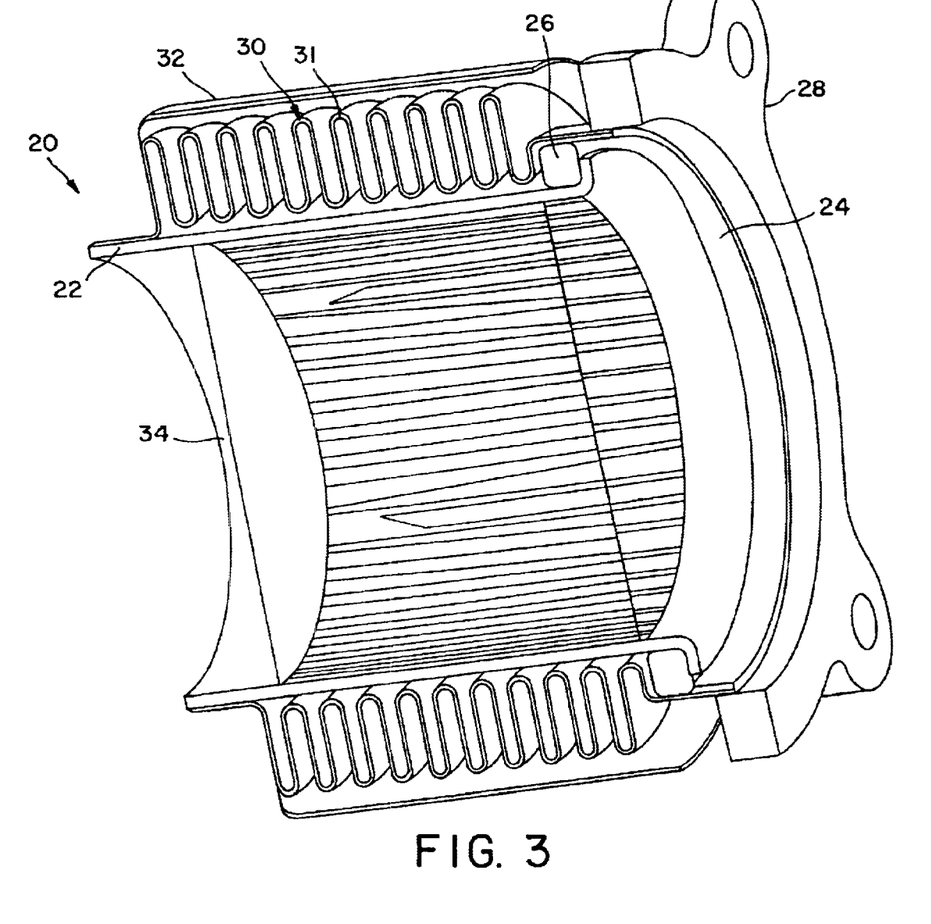
FIG. 3 is a perspective sectional view of the apparatus of FIGS. 1 and 2.
Figure 4:
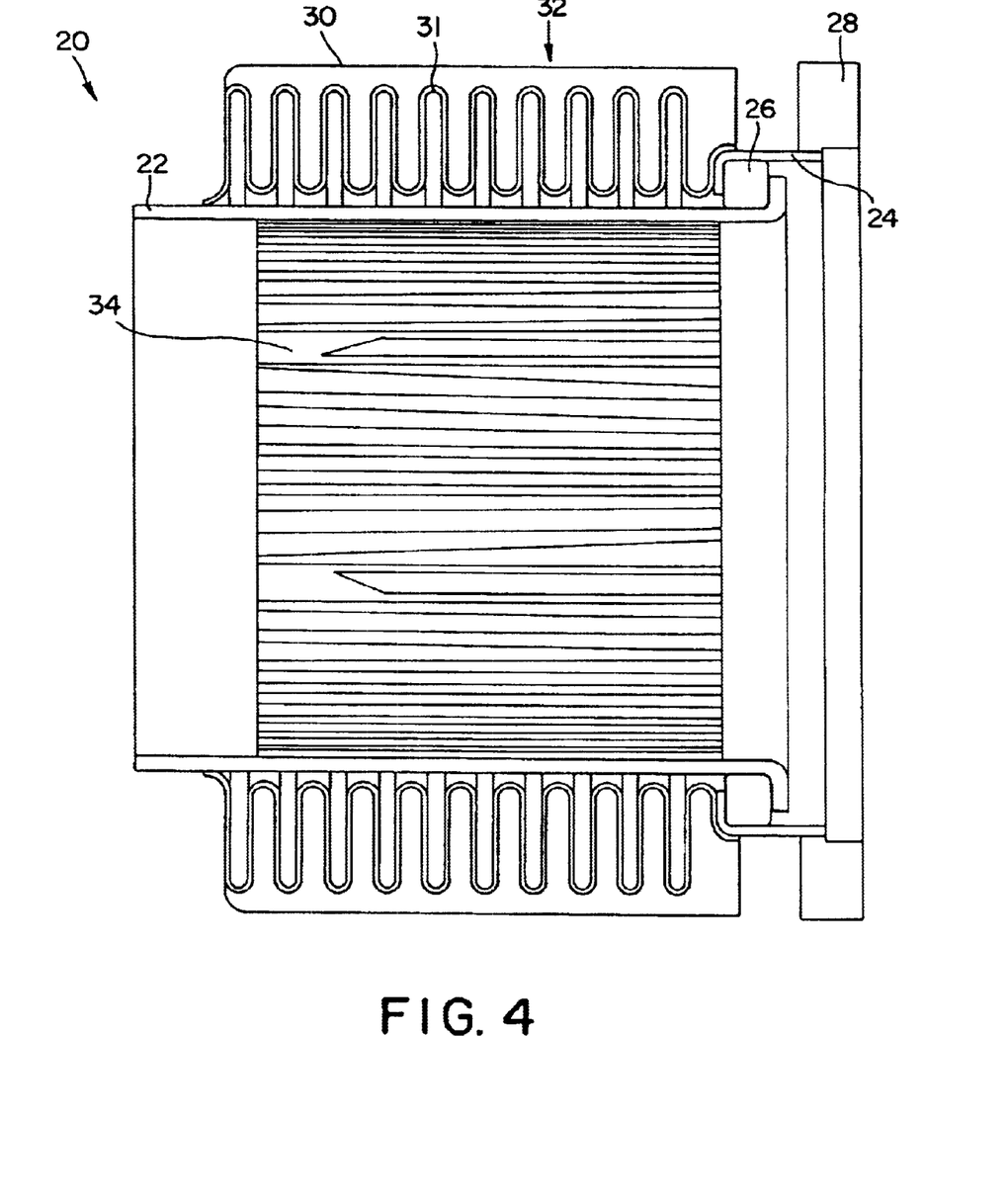
FIG. 4 is a further side elevation, in section, of the apparatus of FIGS. 1-3.
Figure 5:
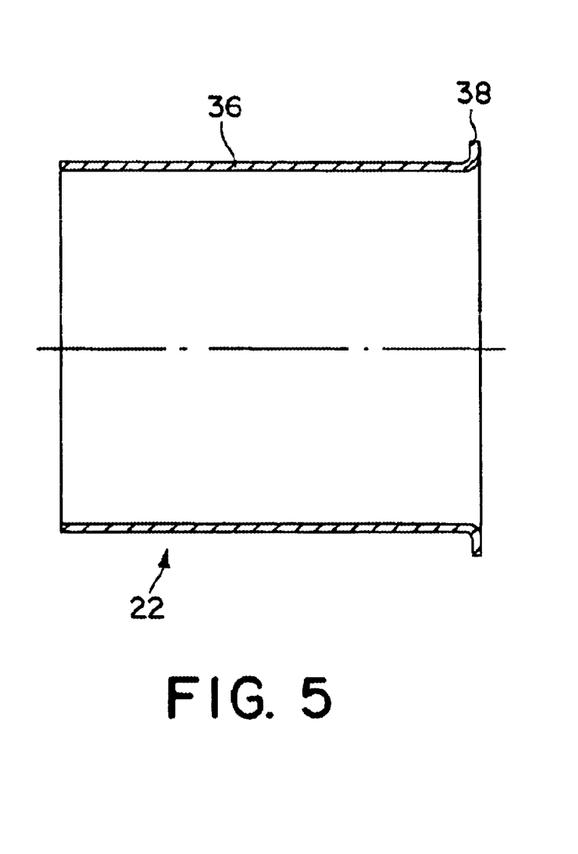
FIG. 5 is a side elevation, in section, of the downstream liner tube.
Figure 6:
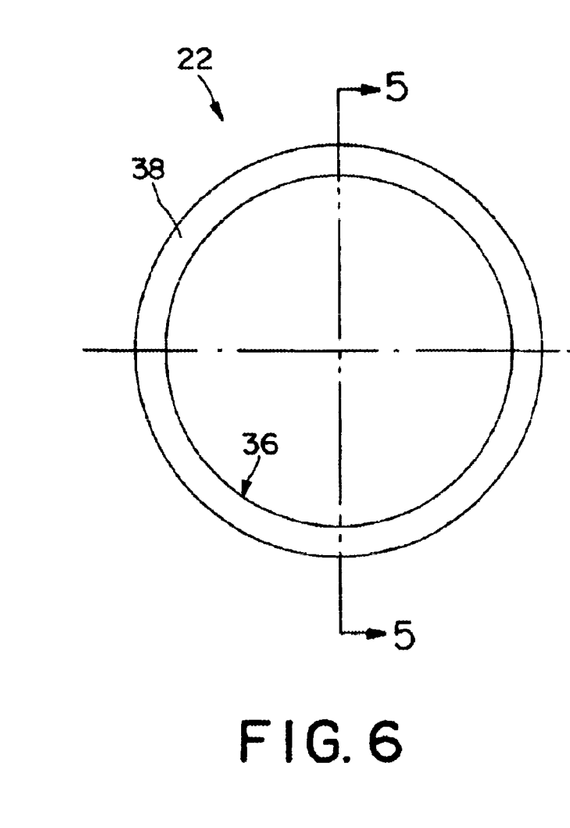
FIG. 6 is an end elevation thereof.
Figure 7:
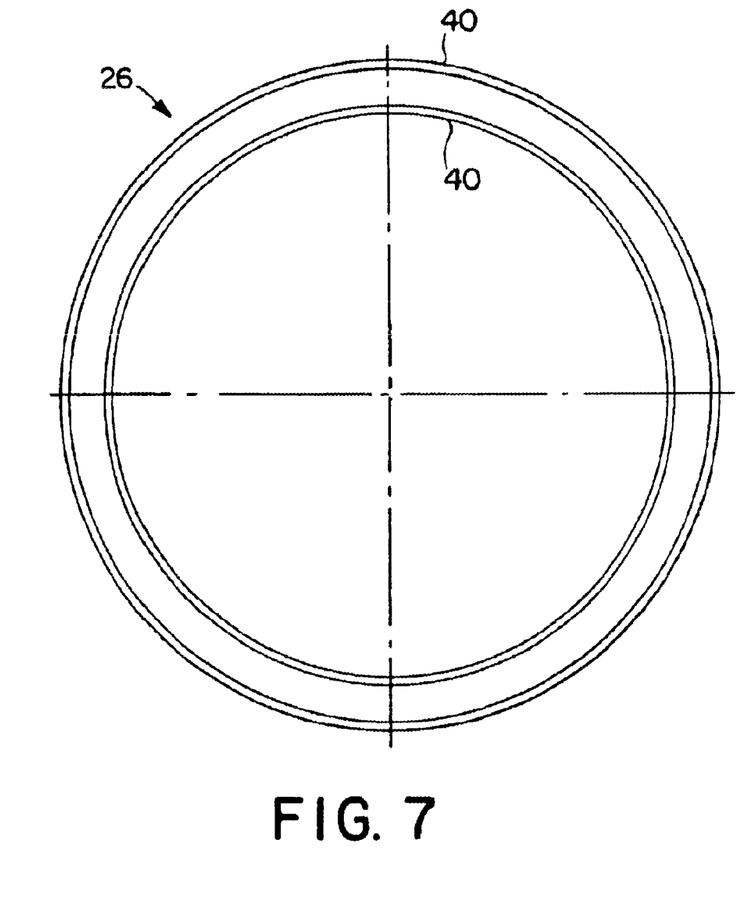
FIG. 7 is an end elevation of a mesh member spacer.
Figure 8:
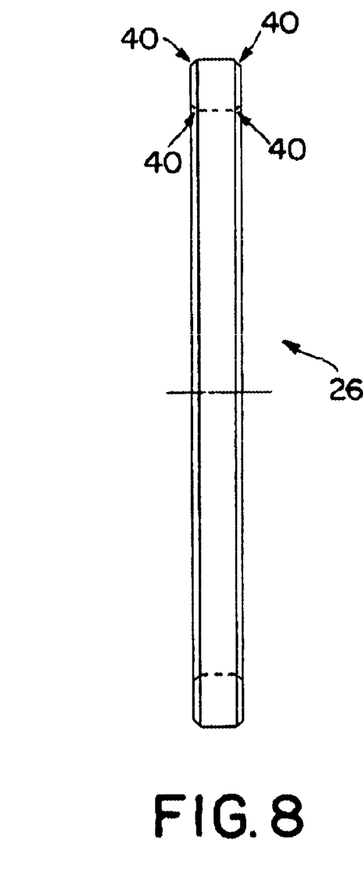
FIG. 8 is a side elevation thereof.
Figure 9:
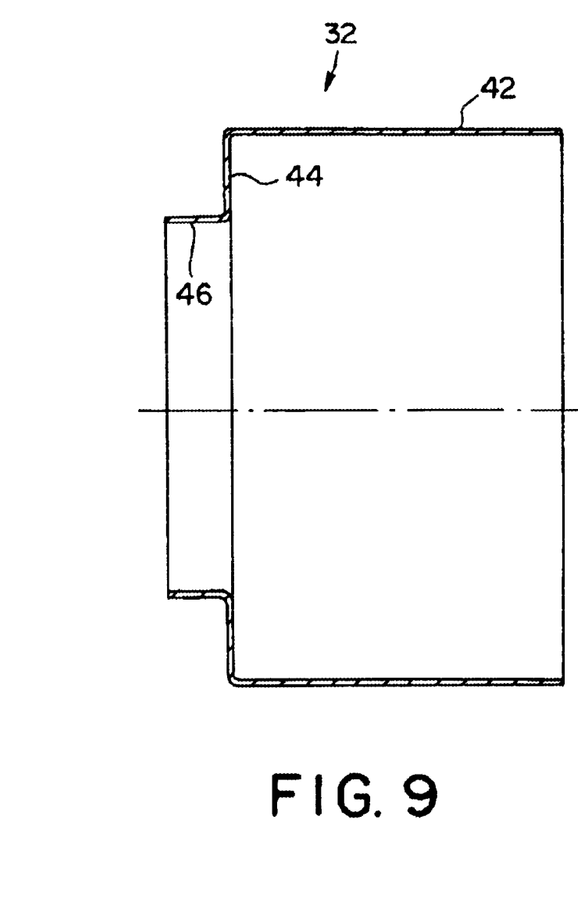
FIG. 9 is a side elevation, in section, of the downstream end cap for protecting the bellows of the apparatus of the present invention.
Figure 10:
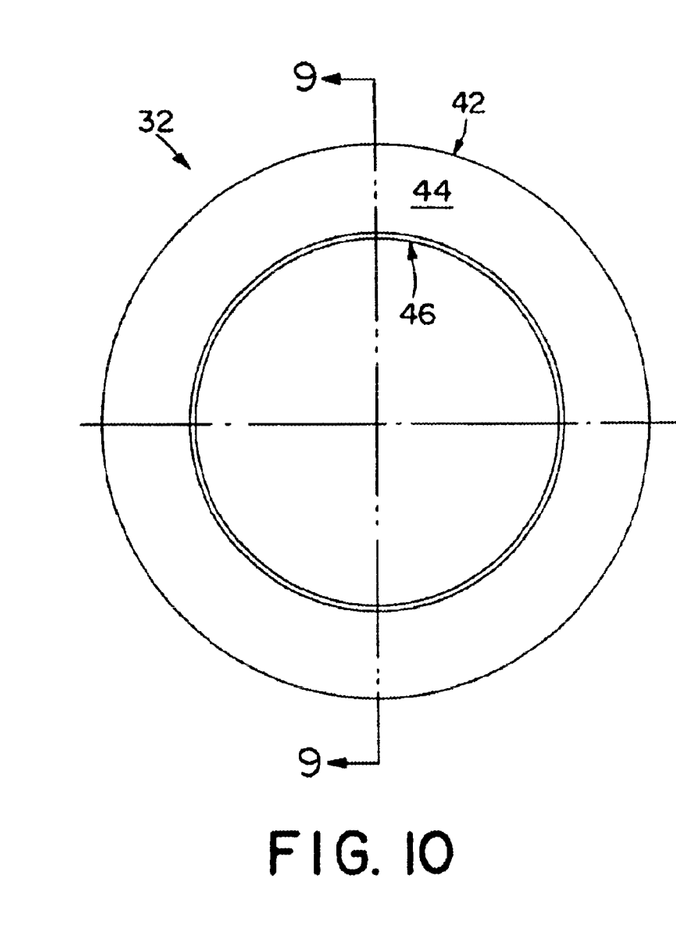
FIG. 10 is an end elevation thereof.
Figure 11:
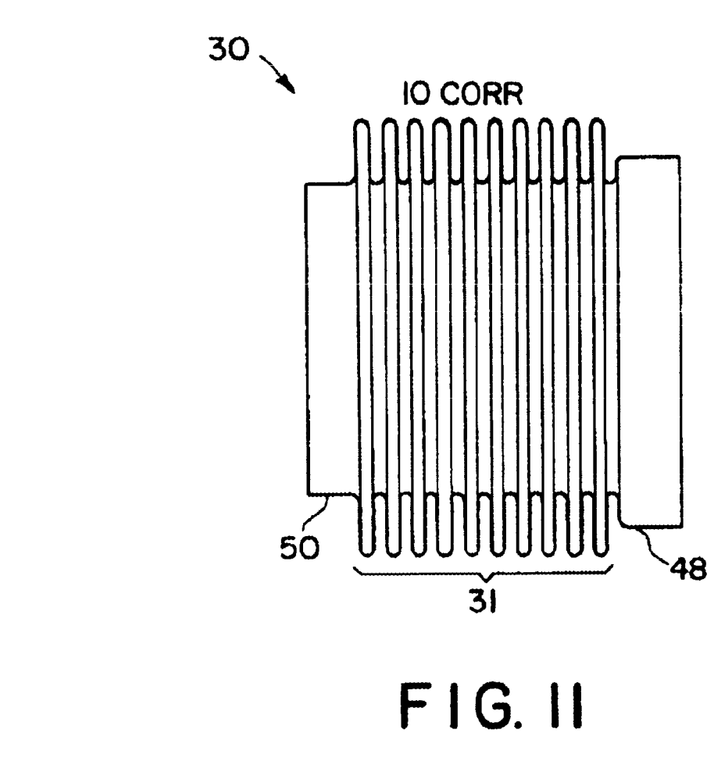
FIG. 11 is a side elevation, in section, of the bellows.
Figure 12:
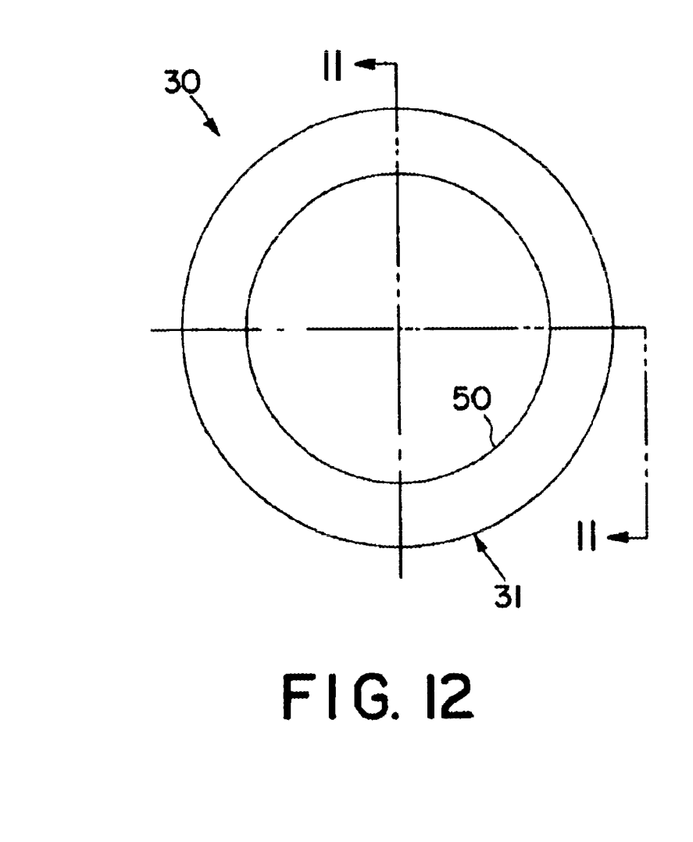
FIG. 12 is an end elevation thereof.
Figure 13:
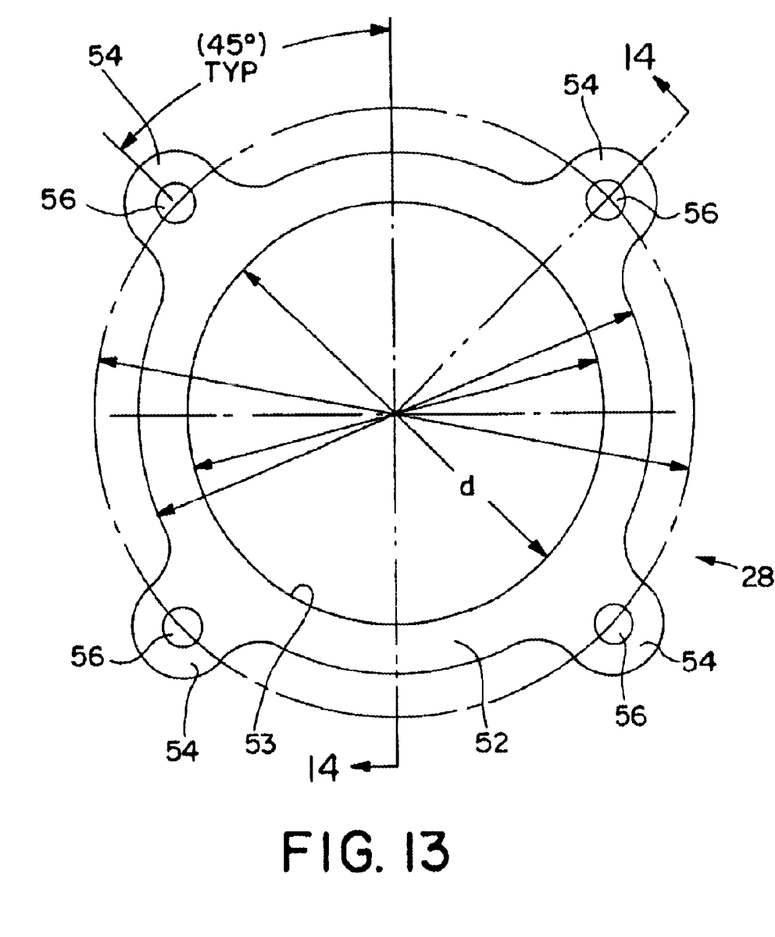
FIG. 13 is an end elevation of the mounting flange.
Figure 14:
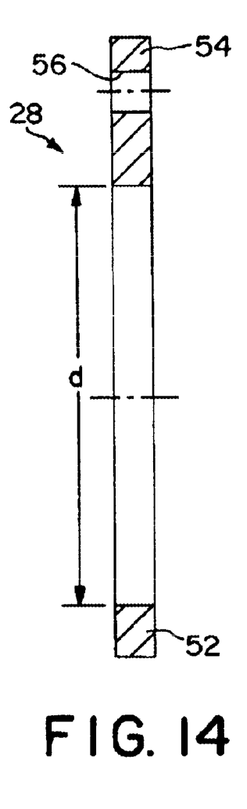
FIG. 14 is a side elevation thereof, in section.
Figure 15:
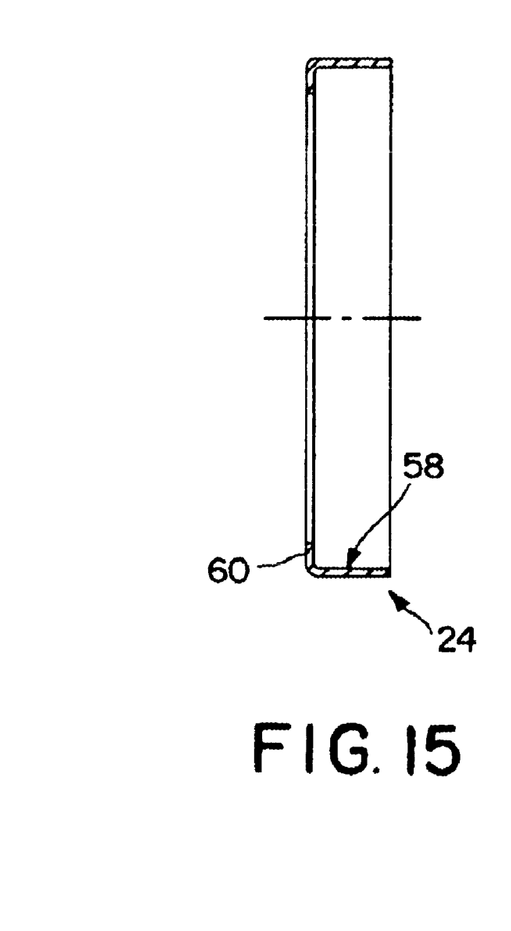
FIG. 15 is a side elevation, in section, of the upstream liner tube for the coupler/catalytic converter of the present invention.
Figure 16:
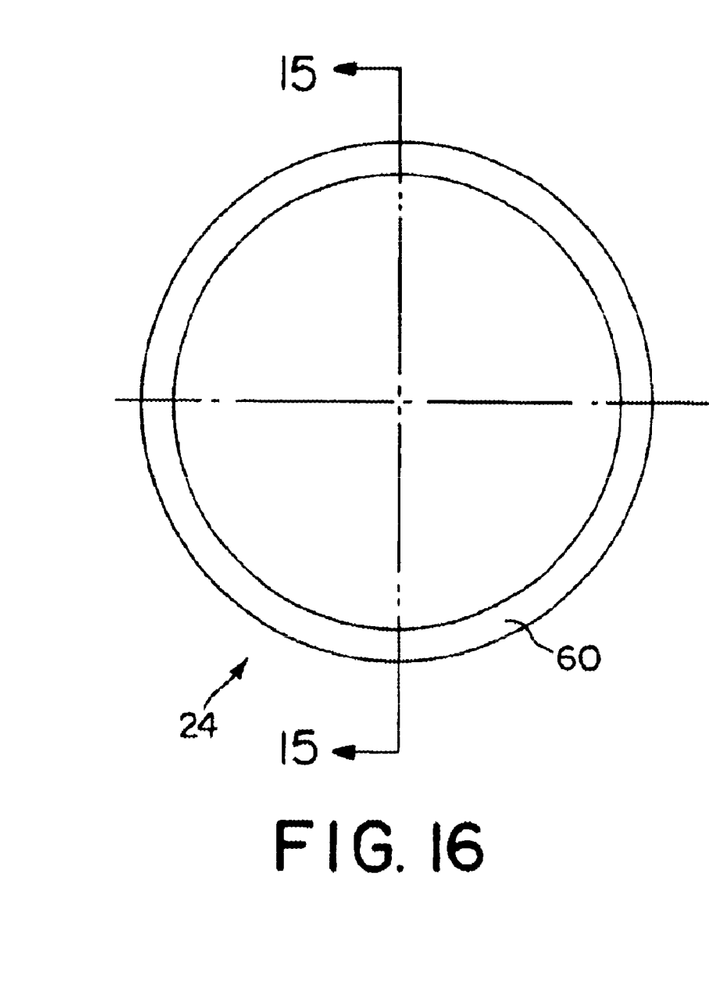
FIG. 16 is an end elevation thereof.

Flexible catalytic converter 20 is illustrated in FIGS. 1-16. Converter 20 is intended to be installed between consecutive upstream and downstream exhaust system components (not shown). Such components may include an exhaust manifold housing or pipe and bracket immediately adjacent the exit to the manifold (upstream), and any downstream pipes ordinarily connected thereto. The arrow in FIG. 2 indicates the preferred direction of flow of exhaust gases through flexible converter 20. Flexible catalytic converter 20 is formed from a flexible vibration decoupling apparatus, that is, in turn, formed by inner liner tube 22, outer liner tube 24, damping member 26 (which is preferably annular), mounting flange 28, bellows 30, and optional end cap 32; and preliminary catalytic converter insert 34.

For the purposes of the present invention, the configuration of catalytic converter insert 34 does not need to be specified, apart from being a substantially cylindrical body, typically about 3 inches long and 3 inches in diameter, or whatever diameter is just slightly less than the innermost diameter of the straight tube 36 (FIG. 5) of inner liner tube 22. Converter insert 34 typically will be brazed or otherwise permanently affixed to the inside surface of straight tube 36, in such a manner that all or substantially all of the exhaust gas flow will be constrained to pass through converter insert 34, and not pass around its outer periphery.

Typically, catalytic converter insert 34 will comprise a porous mesh or baffle member that extends across the flow path (see FIGS. 3 and 4), and is provided with a series of baffles, apertures, flow paths, etc., that expose a substantial surface area to the exhaust gas flow. However, converter insert 34 must be sufficiently "porous" that it does not undesirably increase the back-pressure on the engine. The surfaces of converter insert 34 that will be exposed to the exhaust gases, typically will be coated (via brazing, for example) with the catalytic precious metal material (e.g., platinum). Such converter constructions (apart from the placement within a flexible coupler, that is the subject of the present invention) are known in the prior art, and various converter interior configurations may be employed by one of ordinary skill in the art, having the present disclosure before them without departing from the scope of the invention. Accordingly, it is unnecessary to provide further detail as to the interior construction of the converter insert 34, in order to provide, to one of ordinary skill in the art, a complete understanding of the present invention, and therefore connector 34 has been illustrated substantially schematically.

Fabrication of flexible catalytic converter 20 may be obtained by first sliding damping member 26 onto straight tube 36 of inner liner tube 22, until damping member 26 abuts radial flange 38.

Damping member 26 is preferably fabricated from compressed metal mesh, which may be impregnated with vermiculite-graphite compounds for lubrication and prevention of squeaking. Damping members fabricated from metal mesh are generally known in the art, such as are commercially available and can be obtained from firms such as ACS Industries, Inc., of Woonsocket, R.I. Rather than forming the mesh member from metal, ceramic wools or other similar materials may also be employed, in addition to or instead of metal mesh.

Damping member 26, while dense, is typically at least somewhat porous and slightly deformable, under compressive and torsional forces such as may be encountered in the environment of an automotive exhaust system.

While a single annular damping member is described in a preferred embodiment of the invention, a plurality of arcuate, segment-type damping members, or other, possibly varying configurations and placements, may be employed.

Because the transition from straight tube 36 to radial flange 38 may have a relatively large radius of curvature (on the order of 3–4 mm), in order for damping member 26 to fit snugly against radial flange 38, damping member 26 will be provided with a cross-sectional configuration (see FIG. 8) in which the corners (particularly the inside diameter corners) of the cross-section are chamfered, e.g., at 40.

After damping member 26 has been positioned on inner liner tube 22, inner liner tube 22 and damping member 26 may then be inserted into outer liner tube 24. The side of damping member 26, opposite the side abutting radial flange 38, will be positioned to abut radial flange 60, so that straight tube 58 of outer liner tube 24 extends substantially concentrically to, but in the opposite direction to, straight tube 36 of inner liner tube 22. The transition from straight tube 58 to radial flange 60 likewise may have a relatively large radius of curvature. Accordingly, the outer corners of the cross-section of damping member 26 are also chamfered, e.g., at 40 (FIGS. 7, 8), to permit the corresponding side of damping member 26 to abut flange 60 with a snug fit.

In a preferred embodiment, when flexible catalytic converter apparatus 20 is completely assembled and installed, it has a neutral configuration shown in FIGS. 1, 3, 4, 15 and 16, wherein the radial flanges 38 and 60 abut damping member 26, with slight compressive force being exerted by the flanges on damping member 26. Accordingly, additional compressive force on converter apparatus 20 will tend to drive flanges 38 and 60 apart, relative to one another, while tension forces between the upstream and downstream exhaust components (not shown) will tend to drive flanges 38 and 60 toward one another, compressing damping member 26.

The assembled inner and outer liner tubes 22, 24, and damping member 26 may then be inserted into bellows 30. Bellows 30 is preferably provided with a plurality of corrugations (corrs) 31, the minimum inside diameter of which is greater than the greatest outer diameter of straight tube 36. Bell 48 of bellows 30 (see FIG. 11) has a least inside diameter that preferably may be slightly greater than the outer greatest diameter of straight tube 58 of outer liner tube 24. Indeed, a forced fit between bell 48 and straight tube 58 may be provided, to facilitate establishment of a substantially fluid-tight fit therebetween. Preferably, the axial length of bell 48 will be the same as the axial length of straight tube 58, so that the upstream end edges of straight tube 58 and bell 48 are coterminous. Alternatively, one or the other may extend further upstream.

The upstream ends of straight tube 58 and bell 48 may then be inserted into aperture 53 of mounting flange 28. Mounting flange 28 includes ring 52, with mounting lobes 54 having fastener apertures 56. Preferably, the combined outer diameter of straight tube 58 and bell 48 may be initially formed as a forced fit into aperture 53. Alternatively, the ends of straight tube 58 and bell 48 may be swaged outwardly to be sized to the inner surface of aperture 53. A weld or braze may be placed between straight tube 58 and/or bell 48 and the surface of aperture 53, to create a fluid-tight connection, so that exhaust gases passing through aperture 53 cannot escape through the connection to the ambient atmosphere. Alternatively, bell 48 may be shortened, so that it is not even inserted into aperture 53 of mounting flange 28. In such a construction, the upstream edge of bell 48 may be welded and/or simply crimped around the periphery of straight tube 58 to create the fluid-tight seal between bellows 30 and outer liner tube 24.

To protect bellows 30, end cap 32 may be provided, with bell 42, radial web 44 and collar 46. Bell 42 preferably circumferentially surrounds corrugations 31 of bellows 30, to protect them from abrasion or other undesired contact. Collar 50 of bellows 30 may be brazed or welded to straight tube 36, to create a fluid-tight seal between collar 50 and straight tube 36. In addition to, or as an alternative to welding or brazing, collar 50 may simply be crimped down onto straight tube 36 either by itself, or together with collar 46 of end cap 32, to provide a mechanical connection between bellows 30 and straight tube 36, wherein the fluid tight seal may result from brazing, mechanical crimping, or both.

Catalytic converter insert 34 may be positioned within inner liner tube 22, either before the aforementioned assembly process takes place, or after. While straight tube 36 may be initially sized to provide a forced-fit between insert 34 and tube 36, alternatively, tube 36 may be crimped down around insert 34, to provide the desired durable mechanical connection and, possibly, a fluid tight seal between the outer peripheral surface of insert 34 and the inner surface of straight tube 36. Brazing or welding may also be employed to retain insert 34 in position in tube 36, to create a fluid-tight seal therebetween, or both.

In a preferred embodiment of the invention, illustrated in FIGS. 1–16, the inner liner tube, which is insertingly received and partially overlapped, by the shorter, larger diameter outer liner tube, is the downstream liner tube. It is to be understood that an alternative embodiment of the invention may be constructed, in which the upstream liner tube is formed by a relatively shorter, smaller diameter inner liner tube, and the downstream liner tube is formed by a relatively longer, greater diameter outer liner tube, in which the catalytic converter insert is positioned.

The placement of the preliminary converter insert within the inner liner tube is advantageous for several reasons. By integrating the converter insert into the flexible vibration decoupling connector, the exhaust system benefits by incorporating both the preliminary converter (necessary to enable the next generation of internal combustion engine-powered vehicles to attain the more rigorous emission control standards which will soon come into effect), and the flexible exhaust system connection for decoupling vibrations from the engine from the rest of the exhaust system. Further, preliminary catalytic converters may prove susceptible to vibration-induced fatigue and failure, in that the catalytic materials may become dislodged and/or expelled through prolonged/excessive vibrations. By placing the preliminary catalytic converter insert in the downstream-positioned inner liner tube, the exposure of the preliminary catalytic converter insert to potentially damaging vibrations is reduced. The physical structure of the catalytic converter insert also benefits from the additional protection from external blows afforded by the surrounding inner liner tube, bellows and optional end cap of the flexible vibration decoupling connector of the present invention.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A flexible catalytic converter apparatus, for an exhaust system of an internal combustion engine, comprising:
    a vibration decoupling flexible connector for connecting upstream and downstream components in an exhaust system, including
        an upstream liner tube and a downstream liner tube, in which portions of the liner tubes overlap axially,
        a vibration damping member operably disposed between the upstream and downstream liner tubes,
        a flexible sealing member sealingly connecting the upstream and downstream liner tubes, to preclude escape of exhaust gases, passing through the vibration decoupling flexible connector, to ambient atmosphere, the flexible sealing member circumferentially surrounding at least a portion of the downstream liner tube; and
    a catalytic converter insert, operably disposed within at least the downstream liner tube, and circumferentially surrounded by at least a portion thereof, so that, upon installation of the flexible catalytic converter apparatus into an exhaust system for an internal combustion engine, exhaust gases passing through the vibration decoupling flexible connector are constrained to pass through the catalytic converter insert, for at least partial catalytic conversion of predetermined components of the exhaust gases.

2. The flexible catalytic converter apparatus according to claim 1, wherein the vibration damping member is an annular member.

3. The flexible catalytic converter apparatus according to claim 1, further comprising a mounting flange sealingly connected to an upstream one of the liner tubes, for mechanically and sealingly connecting the vibration decoupling flexible connector to an upstream component of the exhaust system.

4. The flexible catalytic converter apparatus according to claim 1, wherein the vibration damping member is disposed between the overlapping portions of the upstream and downstream liner tubes.

5. The flexible catalytic converter apparatus according to claim 1, wherein the upstream and downstream liner tubes comprise:
    a first liner tube having a first diameter and a radially inwardly extending flange emanating from a first end thereof;
    a second liner tube having a second diameter less than the first diameter, and a radially outwardly extending flange emanating from a first end thereof;
    the first end of the first liner tube axially overlapping the first end of the second liner tube, so that the first end of the first liner tube, the radially inwardly extending flange, the first end of the second liner tube and the radially outwardly extending flange define a substantially enclosed annular region between the overlapping portions of the liner tubes.

6. The flexible catalytic converter apparatus according to claim 5, wherein the first liner tube is the upstream liner tube.

7. The flexible catalytic converter apparatus according to claim 5, wherein the second liner tube is the upstream liner tube.

8. The flexible catalytic converter apparatus, according to claim 5, wherein the vibration damping member is disposed within the substantially enclosed annular region.

9. The flexible catalytic converter apparatus, according to claim 1, wherein the vibration damping member is fabricated from at least one of the following: compressed metal mesh, ceramic wool.

10. The flexible catalytic converter apparatus, according to claim 1, wherein the flexible sealing member is a longitudinally extending bellows, having at least one circumferential, radially extending corrugation.

11. The flexible catalytic converter apparatus, according to claim 1, wherein the catalytic converter insert comprises a substantially cylindrical body, having a plurality of passages extending therethrough, the surfaces of which have catalytic material disposed thereon, whereupon passage of exhaust gases therethrough, the exhaust gases contact the catalytic material and become chemically altered.

12. The flexible catalytic converter apparatus according to claim 1, wherein the catalytic converter insert is positioned, within the downstream liner tube, so as to be substantially mechanically decoupled from vibrations emanating from an upstream exhaust system component, when the flexible catalytic converter apparatus is attached to upstream and downstream exhaust system components.

13. The flexible catalytic converter apparatus according to claim 1, wherein the upstream liner tube is substantially shorter in length than the downstream liner tube, so that upon installation of the flexible converter apparatus into an exhaust system, positioning of the catalytic converter insert in maximized proximity to the exhaust manifold of the internal combustion engine is facilitated.

* * * * *